(12) United States Patent
Nishi

(10) Patent No.: US 10,874,196 B2
(45) Date of Patent: Dec. 29, 2020

(54) MAKEUP PART GENERATING APPARATUS AND MAKEUP PART GENERATING METHOD

(71) Applicant: Panasonic Intellectual Property Management Co., Ltd., Osaka (JP)

(72) Inventor: Chie Nishi, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 309 days.

(21) Appl. No.: 15/925,950

(22) Filed: Mar. 20, 2018

(65) Prior Publication Data

US 2018/0206618 A1 Jul. 26, 2018

Related U.S. Application Data

(63) Continuation of application No. PCT/JP2016/004056, filed on Sep. 6, 2016.

(30) Foreign Application Priority Data

Oct. 26, 2015 (JP) .................. 2015-209984

(51) Int. Cl.
*A45D 44/00* (2006.01)
*G06T 11/00* (2006.01)
(Continued)

(52) U.S. Cl.
CPC ........... *A45D 44/005* (2013.01); *A45D 44/00* (2013.01); *G06T 11/00* (2013.01); *G06T 11/60* (2013.01); *A47G 1/02* (2013.01)

(58) Field of Classification Search
CPC .................. A45D 44/00; A45D 44/005; A45D 2044/007; G06K 9/00281; G06K 9/00221
See application file for complete search history.

(56) References Cited

U.S. PATENT DOCUMENTS

2002/0024528 A1 2/2002 Lambertsen
2003/0133628 A1 7/2003 Lee
(Continued)

FOREIGN PATENT DOCUMENTS

CN 1454370 A 11/2003
CN 104797165 A 7/2015
(Continued)

OTHER PUBLICATIONS

International Search Report of PCT application No. PCT/JP2016/004056 dated Nov. 29, 2016.
(Continued)

*Primary Examiner* — Robert J Utama
(74) *Attorney, Agent, or Firm* — Greenblum & Bernstein, P.L.C.

(57) ABSTRACT

A makeup part generating apparatus is an apparatus for generating a makeup part image to be overlaid on a facial image, and the apparatus includes: a generation-side information acquiring unit (an information acquiring circuitry) that acquires, from a place on a communication network, common attribute information representing a format of part information defining a makeup part image; a part information generator (a makeup part generator) that generates the makeup part; image and a part information generator that generates, according to the format represented by the acquired common attribute information, the part information defining the generated makeup part.

13 Claims, 14 Drawing Sheets

(51) Int. Cl.
  *G06T 11/60*  (2006.01)
  *A47G 1/02*  (2006.01)

(56) References Cited

U.S. PATENT DOCUMENTS

| | | | | |
|---|---|---|---|---|
| 2012/0223956 A1* | 9/2012 | Saito | ............... | G06F 3/014 |
| | | | | 345/582 |
| 2015/0248581 A1* | 9/2015 | Gouda | ............ | G06K 9/00281 |
| | | | | 345/633 |

FOREIGN PATENT DOCUMENTS

| | | |
|---|---|---|
| JP | 2004-094917 | 3/2004 |
| JP | 2009-064423 | 3/2009 |
| JP | 2010-017360 | 1/2010 |
| WO | 2008/102440 | 8/2008 |

OTHER PUBLICATIONS

The Extended European Search Report dated Sep. 12, 2018 for the related European Patent Application No. 16859242.6.
English Translation of Chinese Search Report dated Sep. 27, 2020 for the related Chinese Patent Application No. 201680049358.0.

* cited by examiner

FIG. 3

| ITEM INFORMATION FORMAT | COLOR INFORMATION FORMAT | COSMETICS INFORMATION FORMAT | EXPIRATION DATE FORMAT | EDITABILITY FORMAT |
|---|---|---|---|---|
| 611 | 612 | 613 | 614 | 615 |
| EYEBROW PENCIL, EYESHADOW, BLUSHER, LIPSTICK, ... | 24-BIT RGB, α VALUE IN ALPHA BLENDING | (AID1, AN1), (AID2, AN2), (AID3, AN3) ... | 'YYYY-MM-DD' | EA0: EDITABLE, EA1: NON-EDITABLE |

| ITEM INFORMATION (631) | FACIAL FEATURE POINT CORRESPONDING TO REFERENCE POINT RP1 (632) | FACIAL FEATURE POINT CORRESPONDING TO REFERENCE POINT RP2 (633) | FACIAL FEATURE POINT CORRESPONDING TO REFERENCE POINT RP3 (634) |
|---|---|---|---|
| EYEBROW PENCIL | INNER END OF EYEBROW | OUTER END OF EYEBROW | APEX OF ARC OF EYEBROW |
| ⋮ | ⋮ | ⋮ | ⋮ |
| EYESHADOW | INNER END OF EYE | OUTER END OF EYE | APEX OF EDGE OF UPPER EYELID |
| ⋮ | ⋮ | ⋮ | ⋮ |
| BLUSHER | TIP OF NOSE | CENTER OF EYE | CORNER OF MOUTH |
| ⋮ | ⋮ | ⋮ | ⋮ |

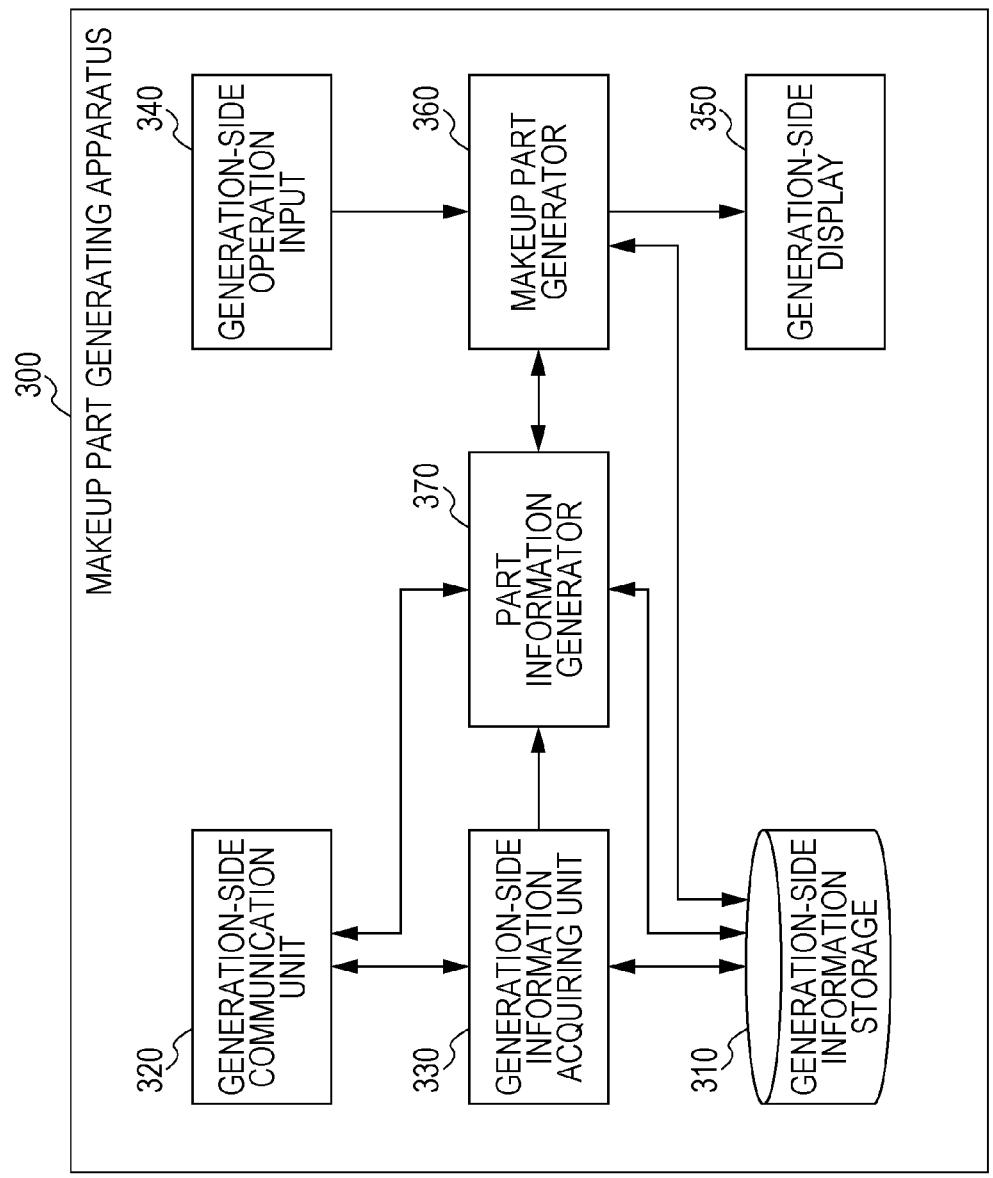

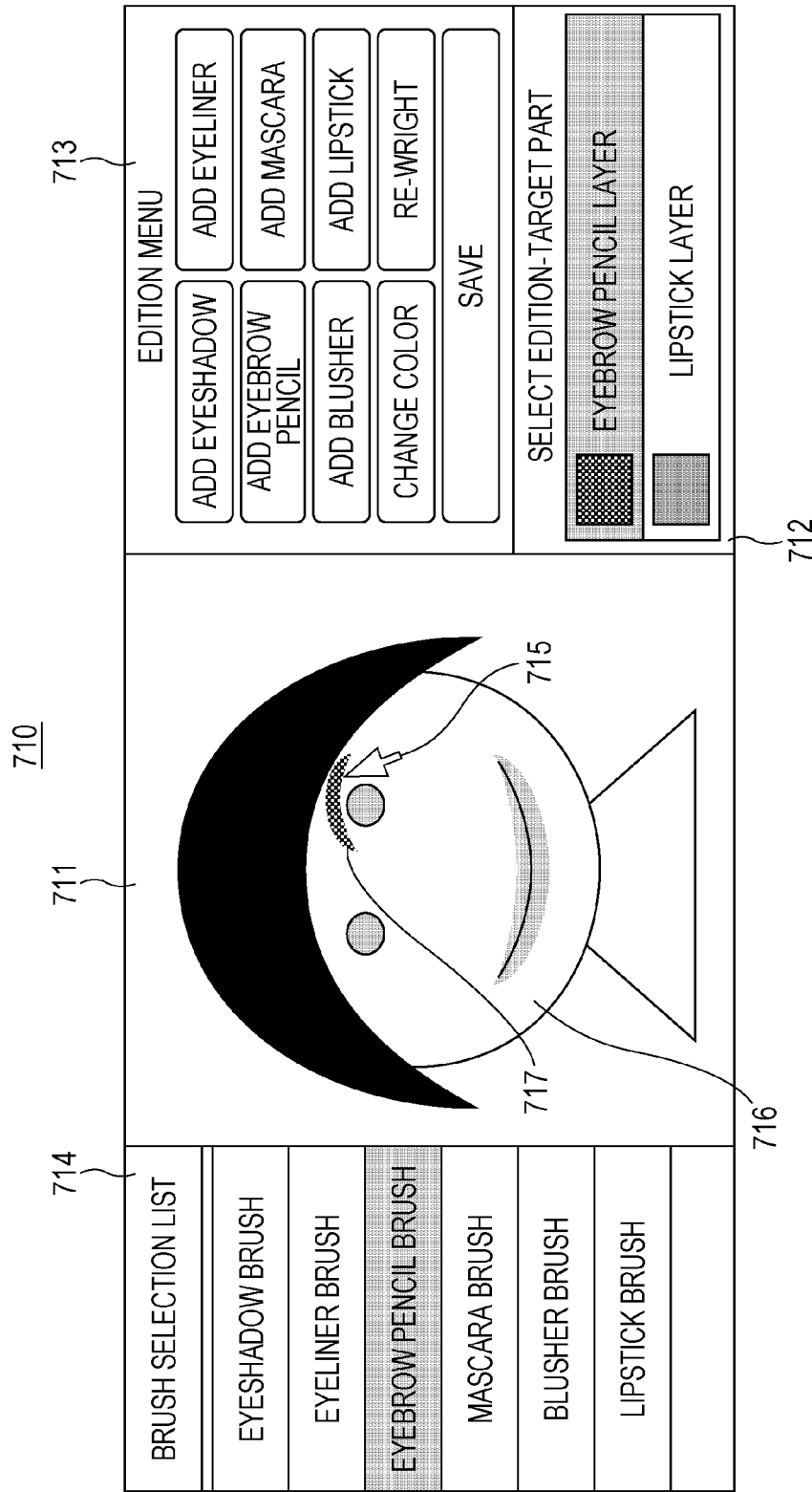

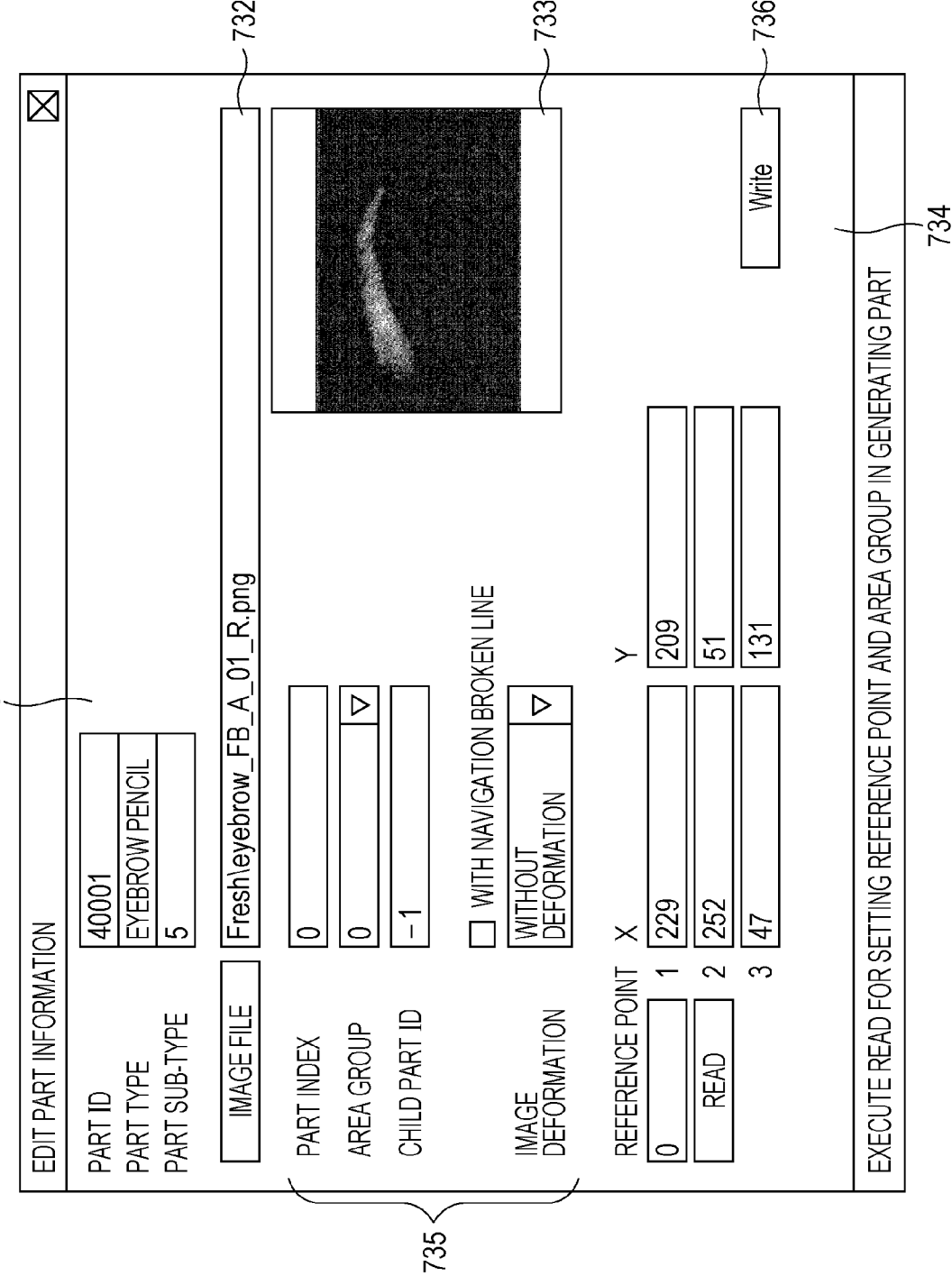

FIG. 10

| PART ID (751) | ITEM INFORMATION (752) | PART IMAGE INFORMATION (753) | POSITIONAL INFORMATION (RP1, RP2, RP3) (754) | COLOR INFORMATION (R, G, B, α) (755) | COSMETICS INFORMATION (PRODUCT ID, NAME) (756) | USER INFORMATION (CREATOR, EXPIRATION DATE, EDITABILITY) (757) |
|---|---|---|---|---|---|---|
| PID1 | EYEBROW PENCIL | eyebrow01.png  | (x11, y11), (x12, y12), (x13, y13) | R1, G1, B1, α1 | AID1, AN1 | UID1, VD1, EA0 |
| PID2 | EYEBROW PENCIL | eyebrow02.png  | (x21, y21), (x22, y22), (x23, y23) | R2, G2, B2, α2 | AID2, AN2 | UID2, VD2, EA1 |
| ⋮ | ⋮ | ⋮ | ⋮ | ⋮ | ⋮ | ⋮ |
| PID6 | EYESHADOW | eyeshadow01.png  | (x61, y61) (x62, y62) (x63, y63) | R6, G6, B6, α6 | AID6, AN6 | UID1, VD1, EA0 |
| ⋮ | ⋮ | ⋮ | ⋮ | ⋮ | ⋮ | ⋮ |
| PID9 | BLUSHER | cheek01.png  | (x91, y91) (x92, y92) (x93, y93) | R9, G9, B9, α9 | AID9, AN9 | UID3, VD3, EA0 |
| ⋮ | ⋮ | ⋮ | ⋮ | ⋮ | ⋮ | ⋮ |

| GROUP ID | GROUP ATTRIBUTE | MAKEUP ENVISAGED IMAGE | PART ID |
|---|---|---|---|
| GID1 | MAKEUP PATTERN | pat01.png | PID1, PID6, IPD9 |
| GID2 | EYE MAKEUP SET | NONE | PID1, PID6 |
| ⋮ | ⋮ | ⋮ | ⋮ |

651 652 653 654

MAKEUP PART GENERATING APPARATUS AND MAKEUP PART GENERATING METHOD

BACKGROUND

1. Technical Field

The present disclosure relates to a makeup part generating apparatus that generates a makeup part image to be overlaid on a facial image, and a corresponding makeup part generating method.

2. Description of the Related Art

Conventionally, there exists the technique of generating a simulation image by overlaying, on a facial image, an image representing makeup (cosmetics) being applied onto the face (for example, see PTLs 1 to 3). The image overlaid on the facial image (hereinafter referred to as the "makeup part" or the "makeup part image")) is generated for each makeup item such as an eye shadow or a blusher, for example. Each makeup part image is defined by part information describing color or density for each relative position with reference to a facial feature point such as an outer end of an eye or a corner of the mouth.

The procedure of generating the makeup part is as follows, for example. Firstly, a makeup artist creates a graphic design of makeup for the entire face, and applies makeup onto the face based on the graphic design. Then, a digitizing technician generates a makeup part for each makeup item using image analysis software or the like from a picked-up image of the face wearing the makeup, while consulting with the makeup artist.

The makeup part image generated in this manner is overlaid on a facial image and displayed on an apparatus that generates a makeup simulation image (hereinafter referred to as the "makeup simulator").

Meanwhile, recent years have seen an increasing number of makeup simulators used at, for example, cosmetics shops and homes and, accordingly, there exists a demand for generating a greater variety of makeup patterns. On the other hand, it takes the time and trouble to follow the above-described procedure in generating a new makeup part every time. Here, it may be contemplated to allow a makeup part generated with a certain apparatus to be available with other apparatus, and further to be editable with the other apparatus.

CITATION LIST

Patent Literature

PTL 1: Unexamined Japanese Patent Publication No. 2004-094917

PTL 2: Unexamined Japanese Patent Publication No. 2009-064423

PTL 3: Unexamined Japanese Patent Publication No. 2010-017360

SUMMARY

However, such secondary use of a makeup part cannot be properly carried out when the manner of defining a makeup part is different between the apparatus generating the makeup part and the apparatus secondarily using the makeup part due to their employing different systems or the like.

That is, the conventional technique suffers from the problem of taking the trouble in generating a makeup part.

One non-limiting and exemplary embodiment provides a makeup part generating apparatus capable of generating a makeup part image easier and a corresponding makeup part generating method.

In one general aspect, the techniques disclosed here feature a makeup part generating apparatus for generating a makeup part image to be overlaid on a facial image, the apparatus including: an information acquiring circuiry that acquires, from a place on a communication network, common attribute information representing a format of part information defining the makeup part image; a makeup part generator that generates and/or edits the makeup part image; and a part information generator that generates, according to the format represented by the acquired common attribute, the generated and/or edited part information defining the makeup part image.

The present disclosure facilitates generation of a makeup part image.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE DRAWINGS

FIG. 3 is a diagram showing an exemplary content of common format information according to the present exemplary embodiment;

FIG. 4 is a diagram showing an exemplary content of common part position information according to the present exemplary embodiment;

FIG. 5 is a block diagram showing an exemplary configuration of a makeup part generating apparatus according to the present exemplary embodiment;

FIG. 8 is a plan view showing an exemplary appearance of a part image generating window according to the present exemplary embodiment;

FIG. 9 is a plan view showing an exemplary appearance of a part information editing window according to the present exemplary embodiment;

FIG. 10 is a diagram showing an exemplary content of a part information group according to the present exemplary embodiment;

FIG. 14 is a diagram showing an exemplary content of group information according to the present exemplary embodiment.

DETAILED DESCRIPTION

In the following, with reference to the drawings, a detailed description will be given of one exemplary embodiment of the present disclosure.

System Overview

Firstly, a description will be given of the overview of a makeup part generating system including a makeup part generating apparatus according to the present exemplary embodiment.

Figure 1:
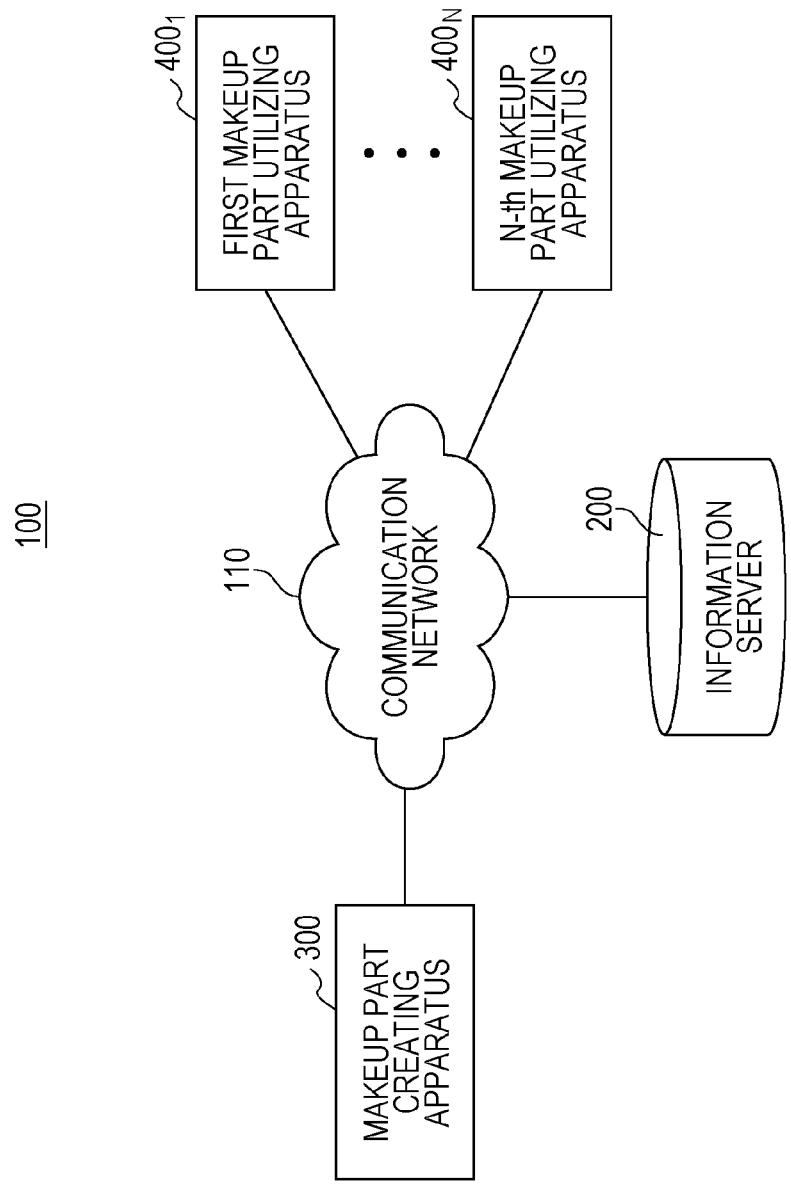
FIG. 1 is a system configuration diagram showing an exemplary configuration of a makeup part generating system including a makeup part generating apparatus according to one exemplary embodiment of the present disclosure.

FIG. 1 is a system configuration diagram showing an exemplary configuration of the makeup part generating system including the makeup part generating apparatus according to the present exemplary embodiment.

In FIG. 1, makeup part generating system 100 includes information server 200, makeup part generating apparatus 300, and a plurality of makeup part utilizing apparatuses 400 (4001 to 400N) communicatively connected to each other via communication network 110 such as the Internet. Note that, communication network 110, information server 200, makeup part generating apparatus 300, and makeup part utilizing apparatuses 400 as a whole can be regarded as a communication network. Further, makeup part generating apparatus 300 and makeup part utilizing apparatuses 400 can be regarded as a makeup part generating apparatus that generates a makeup part being an image overlaid on a facial image.

Information server 200 is an apparatus including an information recording medium (not shown) such as a large-capacity hard disk drive. Information server 200 stores common attribute information in advance, and stores part information uploaded by makeup part generating apparatus 300 or makeup part utilizing apparatuses 400.

The part information is information that defines a makeup part being an image overlaid on a facial image. The common attribute information is information representing the format of the part information, that is, information that defines the description format of the part information to be used in a common manner in makeup part generating system 100. The part information and the common attribute information will be detailed later.

Makeup part generating apparatus 300 is an apparatus that generates a new makeup part from scratch, for example according to the above-described procedure. Makeup part generating apparatus 300 generates part information that defines the generated makeup part, and transmits the generated part information to information server 200, to upload (store) the part information to information server 200.

Makeup part utilizing apparatuses 400 each make access to information server 200, and acquire the part information uploaded to information server 200. Makeup part utilizing apparatuses 400 each generate a part image from the acquired part information, and overlay the generated part image on a facial image and display the resultant image. That is, makeup part utilizing apparatuses 400 each acquire a makeup part generated by makeup part generating apparatus 300 from information server 200 and utilize the makeup part. Makeup part utilizing apparatuses 400 are each, for example, the above-described makeup simulator.

Figure 2:
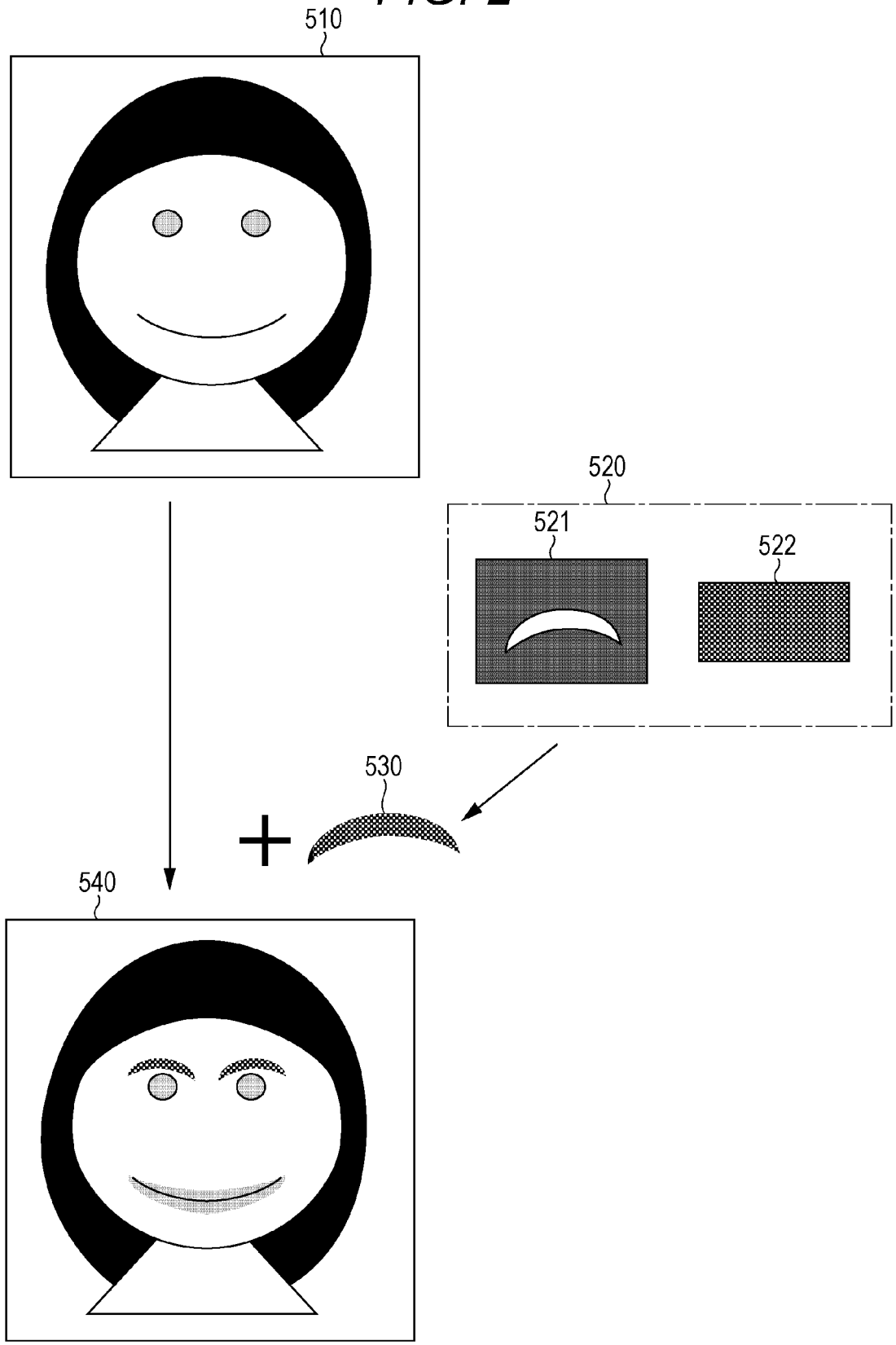
FIG. 2 is a schematic diagram showing an exemplary manner of utilizing a makeup part according to the present exemplary embodiment.

FIG. 2 is a schematic diagram showing an exemplary manner of utilizing a makeup part in one makeup part utilizing apparatus 400.

As shown in FIG. 2, makeup part utilizing apparatus 400 acquires, for example, picked-up image 510 of a face wearing no makeup, and part information 520 including makeup application region 521 and color 522. Note that, picked-up image 510 may be a picked up image being horizontally inverted. Further, makeup part utilizing apparatus 400 generates part image 530 using part information 520 and disposition of a plurality of facial feature points included in the picked-up image. Then, makeup part utilizing apparatus 400 overlays generated part image 530 on picked-up image 510, to generate makeup simulation image 540.

However, when makeup part utilizing apparatus 400 fails to correctly interpret the part information generated by makeup part generating apparatus 300, part image 530 may fail to appear in the intended design, or even worse, no part image may be generated. When no part image is generated, makeup part utilizing apparatus 400 cannot edit and utilize part image 530.

In view of the foregoing, makeup part generating apparatus 300 and makeup part utilizing apparatuses 400 each acquire common attribute information from information server 200, and generate (including generating and editing) or display a makeup part based on the common attribute information. Thus, makeup part generating system 100 allows a makeup part to be secondarily used among a plurality of apparatuses, and facilitates generation of a makeup part.

Common Attribute Information

Here, a detailed description will be given of the common attribute information stored in information server 200. The common attribute information includes, for example, common format information, and common part position information. The common format information is information representing the format of the part information defining a makeup part. The common part position information is information representing the type of a facial feature point being the reference of the position where a makeup part is overlaid.

FIG. 3 is a diagram showing an exemplary content of the common format information.

As shown in FIG. 3, common format information 610 includes, for example, item information format 611, color information format 612, cosmetics information format 613, expiration date format 614, and editability format 615.

Item information format 611 is a format of item information representing the type of a makeup item. For example, item information format 611 describes identification information on specific makeup items such as an "eyebrow pencil", an "eye shadow" and the like, for a multitude of makeup items.

Color information format 612 is a format of color information representing the color and the manner of overlaying a makeup part. For example, color information format 612 describes identification information in well-known color expression rules and image combining schemes such as "24 RGB, a value in alpha blending".

Cosmetics information format 613 is a format of cosmetics information representing the cosmetics to be used in realizing makeup corresponding to a makeup part. For example, cosmetics information format 613 describes identification information (product ID and name) of specific cosmetics such as "AID1, AN1", for a multitude of cosmetics.

Expiration date format 614 is a format of information representing the use (utilization) expiration date of a makeup part. For example, expiration date format 614 describes identification information in a well-known date expression rule such as "YYYY-MM-DD".

Editability format 615 is a format of information representing whether or not edition of a makeup part is permitted. For example, editability format 615 describes specific identification information and its meaning, such as "EA0: editable", "EA1: non-editable". Note that, the information representing whether or not edition of a makeup part is permitted may be a content specifying the edition target in more detail, such as "just the color is editable".

FIG. 4 is a diagram showing an exemplary content of the common part position information.

As shown in FIG. 4, common part position information 630 describes, for each piece of item information 631, facial feature points 632 to 634 respectively corresponding to a plurality of reference points RP1 to RP3.

While a description will be given later, when part information is generated, in a part image of a makeup part, a point corresponding to a facial feature point (a part being characteristic in a facial image, whose position is easily detected by analysis of the facial image) such as the inner end of an eye or a corner of the mouth is set as a reference point. Normally, there are a plurality of reference points, and the facial feature point used in setting the reference point differs for each makeup item. Accordingly, common part position information 630 defines the correspondence between the reference point and the facial feature point for each piece of item information 631 (for each makeup item).

Configuration of Apparatuses

Next, a description will be given of the configuration of the apparatuses of makeup part generating system 100.

Information server 200 includes a communication unit (not shown) that communicatively connects to each of makeup part generating apparatus 300 and a plurality of makeup part utilizing apparatuses 400 via communication network 110. Further, information server 200 includes a database unit (not shown) that stores part information received from makeup part generating apparatus 300 or makeup part utilizing apparatuses 400, and transmits the stored part information in response to any request from makeup part generating apparatus 300 or makeup part utilizing apparatuses 400. The database unit includes the above-described information recording medium.

Wth such a configuration, information server 200 allows the common attribute information and the part information to be shared among makeup part generating apparatus 300 and the plurality of makeup part utilizing apparatuses 400.

FIG. 5 is a block diagram showing an exemplary configuration of makeup part generating apparatus 300.

In FIG. 5, makeup part generating apparatus 300 includes generation-side information storage 310, generation-side communication unit 320, generation-side information acquiring unit 330, generation-side operation input 340, generation-side display 350, makeup part generator 360, and part information generator 370.

Generation-side information storage 310 stores various kinds of information acquired or generated by generation-side information acquiring unit 330, part information generator 370, and makeup part generator 360.

Generation-side communication unit 320 is communicatively connected to at least information server 200 via communication network 110.

Generation-side information acquiring unit 330 acquires common attribute information from information server 200 via generation-side communication unit 320. Note that, generation-side information acquiring unit 330 may acquire, out of the common attribute information stored in information server 200, just part of information such as information required for generating part information by part information generator 370.

Generation-side operation input 340 includes a pointing device (not shown) such as a graphic tablet, and accepts various operations of the user of makeup part generating apparatus 300 on makeup part generating apparatus 300. Then, generation-side operation input 340 notifies makeup part generator 360 of the content of the operation every time such an operation is performed.

Generation-side display 350 includes a display device (not shown) such as a liquid crystal tablet, and displays various images in response to control (for example, an input of an image signal) from makeup part generator 360.

Using generation-side operation input 340 and generation-side display 350, makeup part generator 360 implements a drawing interface for accepting an operation of drawing a part image on a facial image, and generates a makeup part based on such a drawing operation.

Part information generator 370 acquires the makeup part generated by makeup part generator 360, and generates part information defining the makeup part according to the format represented by the common attribute information acquired by generation-side information acquiring unit 330. Then, part information generator 370 transmits the generated part information to information server 200 via generation-side communication unit 320.

Note that, makeup part generator 360 may be general-purpose drawing application software, for example. In this case, generation-side information acquiring unit 330 and part information generator 370 may be configured as plug-ins (changeable application codes) for such drawing application software.

Wth such a configuration, makeup part generating apparatus 300 can generate part information according to the format represented by the common attribute information, and upload the part information to information server 200.

Figure 6:
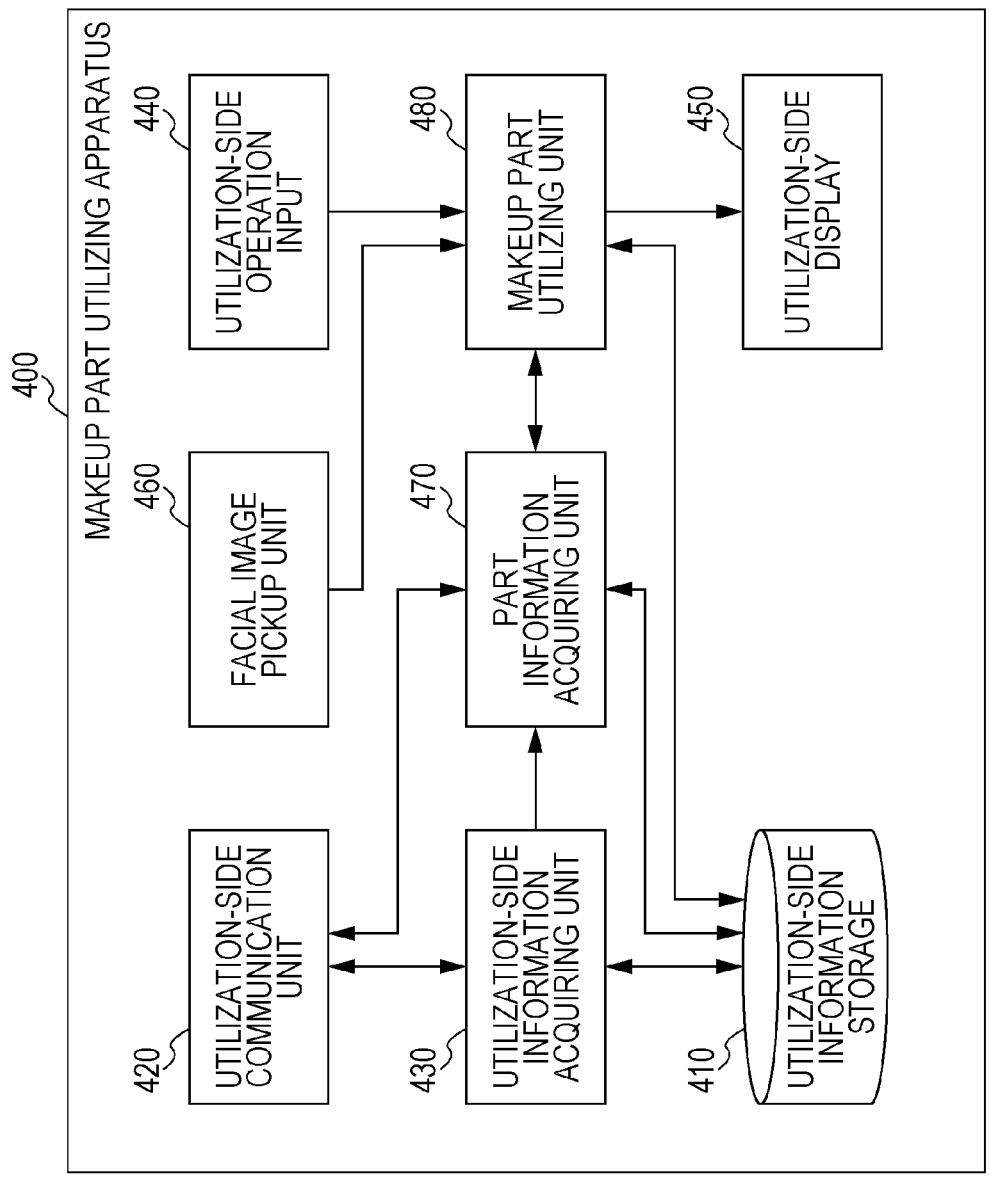
FIG. 6 is a block diagram showing an exemplary configuration of a makeup part utilizing apparatus according to the present exemplary embodiment.

FIG. 6 is a block diagram showing an exemplary configuration of each makeup part utilizing apparatus 400.

In FIG. 6, makeup part utilizing apparatus 400 includes utilization-side information storage 410, utilization-side communication unit 420, utilization-side information acquiring unit 430, utilization-side operation input 440, utilization-side display 450, facial image pickup unit 460, part information acquiring unit 470, and makeup part utilizing unit 480.

Utilization-side information storage 410 stores various kinds of information acquired or generated by utilization-side information acquiring unit 430, makeup part utilizing unit 480, and part information acquiring unit 470.

Utilization-side communication unit 420 communicatively connects to at least information server 200 via communication network 110.

Utilization-side information acquiring unit 430 acquires common attribute information from information server 200 via utilization-side communication unit 420. Note that, utilization-side information acquiring unit 430 may acquire, out of the common attribute information stored in information server 200, just part of information such as information required for editing part information by makeup part utilizing unit 480.

Utilization-side operation input 440 includes a pointing device (not shown) such as a graphic tablet, and accepts various operations of the user of makeup part utilizing apparatus 400 on makeup part utilizing apparatus 400. Then, utilization-side operation input 440 notifies makeup part utilizing unit 480 of the content of the operation every time such an operation is performed.

Utilization-side display 450 includes a display device (not shown) such as a liquid crystal tablet, and displays various images in response to control (for example, an input of an image signal) from makeup part utilizing unit 480. Note that, the display device may be a so-called electronic mirror apparatus that serves as a mirror by displaying an image picked up with a camera, which will be described later, on a display. The electronic mirror apparatus may be an apparatus capable of switching between the image displaying state and the mirror-state, and may be an apparatus displaying an image as being overlaid on a mirror.

Facial image pickup unit 460 includes, for example a digital camera, and picks up an image of a facial image of the face being the target of makeup simulation. Then, facial image pickup unit 460 outputs the picked up facial image to makeup part utilizing unit 480.

Part information acquiring unit 470 acquires part information from information server 200 via utilization-side communication unit 420. Note that, part information acquiring unit 470 may acquire, out of the part information stored in information server 200, just part of information such as information required for displaying the part information by makeup part utilizing unit 480. Then, part information acquiring unit 470 interprets the acquired part information based on the common attribute information acquired by utilization-side information acquiring unit 430, and generates a makeup part (a part image) and outputs the generated makeup part to makeup part utilizing unit 480.

Further, using makeup part utilizing unit 480, part information acquiring unit 470 implements an attribute editing interface for accepting an editing operation of editing the attribute of a part image (editability or the like), and edits the attribute of part information based on such an editing operation. Then, when the editing of the attribute by makeup part utilizing unit 480 or editing of an image by makeup part utilizing unit 480, which will be described later, is performed, part information acquiring unit 470 generates new part information based on the edited attribute or the makeup part and the common attribute information. Then, part information acquiring unit 470 transmits the generated part information to information server 200 via utilization-side communication unit 420.

Makeup part utilizing unit 480 overlays, on the facial image acquired by facial image pickup unit 460, the part image acquired by part information acquiring unit 470, to generate a makeup simulation image. Then, using utilization-side display 450, makeup part utilizing unit 480 displays the generated makeup simulation image. Further, makeup part utilizing unit 480 may have the functions similar to those of generation-side operation input 340 and generation-side display 350 of makeup part generating apparatus 300 described above. Using these functions, makeup part utilizing unit 480 implements a part editing interface for accepting an editing operation of editing a part image, and edits a makeup part (part image) based on such an editing operation.

Note that, makeup part utilizing unit 480 may be, for example, general-purpose drawing application software. In this case, utilization-side information acquiring unit 430 and part information acquiring unit 470 may be configured as plug-ins (changeable application codes) for such drawing application software.

Wth such a configuration, each makeup part utilizing apparatus 400 can properly reconstruct a makeup part from the part information generated by makeup part generating apparatus 300. Further, each makeup part utilizing apparatus 400 can generate a new makeup part by editing the part image or attribute of the reconstructed makeup part according to the format represented by the common attribute information, and upload the generated new makeup part to information server 200.

Note that, while not shown in the drawings, the above-described apparatuses each include, for example, a central processing unit (CPU), a storage medium such as read only memory (ROM) storing any control program, work memory such as random access memory (RAM), and a communication circuit. In this case, the functions of the above-described units are realized by the CPU executing the control program.

Operations of Apparatuses

Next, a description will be given of the operations of the apparatuses.

Information server 200 sequentially determines whether or not requests from other apparatuses for downloading the common attribute information, uploading part information, and downloading part information are received. Then, each time information server 200 receives such a request, information server 200 performs transmission of the common attribute information, reception and storage of the part information, or transmission of the part information, in response to the request.

Note that, every time the stored information is updated, information server 200 desirably notifies makeup part generating apparatus 300 and makeup part utilizing apparatuses 400 of the update. Further, for example, information server 200 notifies the apparatuses of the range of usable values for part ID, so that desirably a unique part ID is allocated to each makeup part generated in the whole system.

Note that, allocation of unique IDs may be performed by, instead of a server such as information server 200 collectively managing IDs performing notification, setting the devices to be unique according to a predetermined algorithm or rule. For example, such IDs may be achieved by using the identifier including the product number, the network address, the software license number or the like of the devices (terminals) including the makeup part generating apparatus.

Figure 7:
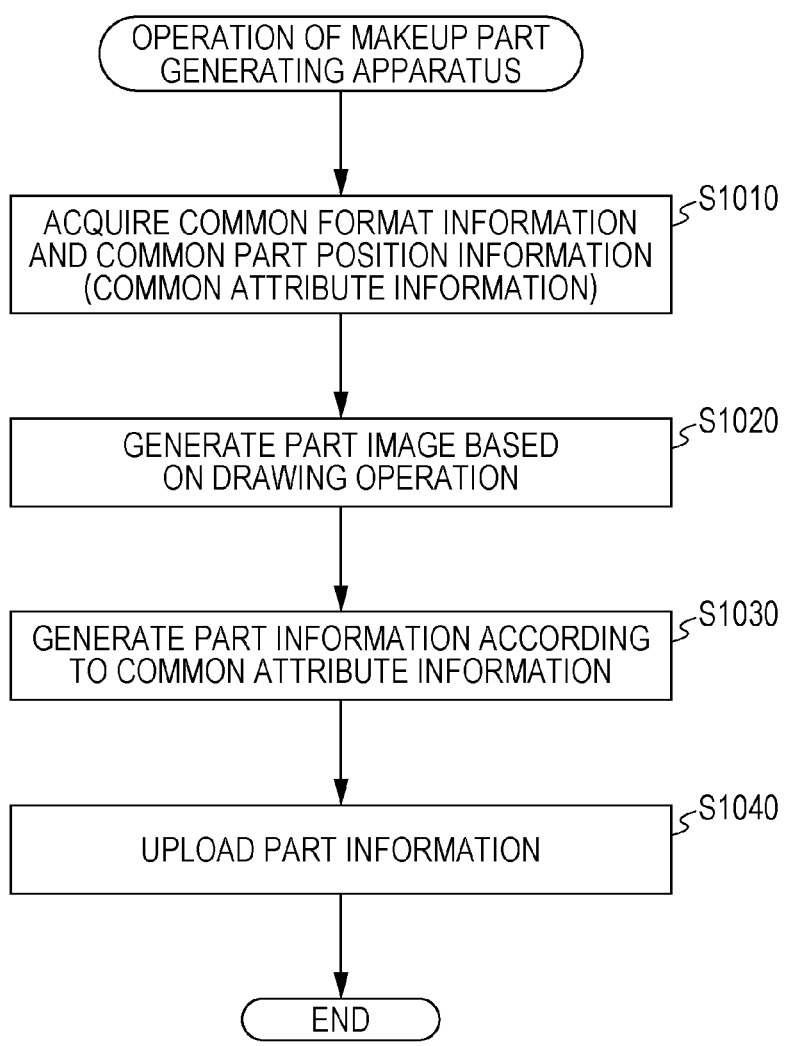
FIG. 7 is a flowchart showing an exemplary operation of the makeup part generating apparatus according to the present exemplary embodiment.

FIG. 7 is a flowchart showing an exemplary operation of makeup part generating apparatus 300.

In step S1010, generation-side information acquiring unit 330 acquires common format information 610 (see FIG. 3) and common part position information 630 (see FIG. 4) (the common attribute information). Note that, generation-side information acquiring unit 330 desirably acquires the common attribute information from information server 200 at a predetermined cycle such as every week or every six months, at timing specified by the user of makeup part generating apparatus 300, or every time an update notice about the common attribute information is received from information server 200.

In step S1020, makeup part generator 360 generates a part image based on a drawing operation of the user of makeup part generating apparatus 300. For example, makeup part generator 360 generates a part image generating window for accepting a generating operation of a part image, displays the part image generating window via generation-side display 350, and accepts the generating operation via generation-side operation input 340.

FIG. 8 is a plan view showing an exemplary appearance of the part image generating window.

As shown in FIG. 8, part image generating window 710 includes facial image displaying region 711, edition-target part selecting region 712, edition menu region 713, and brush selection list region 714. Further, disposed on part image generating window 710 is cursor 715 with which a shifting operation and a clicking operation can be carried out via generation-side operation input 340.

Facial image displaying region 711 displays facial image 716. Facial image 716 may be a facial image of the standard face generated by computer graphics or the like, or may be a facial image picked up by a not-shown digital camera. Further, generation-side information storage 310 may store, for each category such as race, age, gender, facial type (such as a round face, a rectangular face), facial image 716 with related information (the size of the standard face in the category or the like). Makeup part generator 360 may resize the facial image to attain the size of the standard face by referring to the size of the standard face stored in generation-side information storage 310. Thus, in overlaying any part image on other face differing in size or disposition of the facial feature points in other apparatus, the amount of expansion or contraction reduces and, consequently, a deterioration in image quality reduces.

Note that, makeup part generator 360 extracts a plurality of facial feature points included in facial image 716 from facial image 716 by any known image analysis scheme such as pattern matching, and sets the position of each of the facial feature points. This setting may be, for example, manually performed by the user of makeup part generating apparatus 300.

Edition-target part selecting region 712 accepts selection of a makeup part which is the part image generation target. Note that, makeup part generator 360 desirably sets options in edition-target part selecting region 712 according to item information format 611 (see FIG. 3) included in the common attribute information acquired by generation-side information acquiring unit 330. Further, this setting may be performed by part information generator 370.

Edition menu region 713 accepts selection of an image operation, such as adding, editing, or storing a part image. Note that, makeup part generator 360 desirably sets options in edition menu region 713 according to item information format 611 and color information format 612 (see FIG. 3) included in the common attribute information acquired by generation-side information acquiring unit 330. Further, this setting may be performed by part information generator 370.

Brush selection list region 714 accepts selection of a virtual brush used in drawing a part image.

Makeup part generator 360 receiving a drawing operation generates corresponding part image 717 substantially in real time and overlays the generated part image 717 on facial image 716.

In step S1030 in FIG. 7, according to the common attribute information, part information generator 370 generates part information of the part image (the makeup part) generated by makeup part generator 360.

Part information generator 370 generates, for example, using makeup part generator 360, a part information editing window for accepting a setting operation for any insufficient portion or any supplemental portion for the part information. Then, part information generator 370 displays the part information editing window via generation-side display 350, and accepts the setting operation via generation-side operation input 340. For example, when a predetermined operation is performed on part image generating window 710, part information generator 370 detects the operation and displays the part information editing window.

FIG. 9 is a plan view showing an exemplary appearance of the part information editing window.

As shown in FIG. 9, part information editing window 730 includes item setting region 731, image selecting region 732, image displaying region 733, reference point checking region 734, various information setting region 735, and generation completion button 736.

Item setting region 731 accepts setting of the type of any makeup part according to item information format 611 of common format information 610. Note that, as described above, in the case where options in edition-target part selecting region 712 (see FIG. 8) in part image generating window 710 have been set according to item information format 611 (see FIG. 3), the setting of the type may have been completed.

Image selecting region 732 accepts selection of a part image (or a reference image for making access to the part image) being the target of generating part information. Further, image displaying region 733 visually displays the part image selected in image selecting region 732.

Note that, part information generator 370 presents options as to a combining manner according to color information format 612 (see FIG. 3) included in the common attribute information acquired by generation-side information acquiring unit 330.

Reference point checking region 734 displays, as the reference point, the position of a facial feature point to be referred to with the set makeup item, out of a multitude of facial feature points included in facial image 716. This position is, for example, a coordinate value of each point in the part image. Note that, the facial feature point to be referred to is, for example, facial feature points 632 to 634 (see FIG. 4) included in the common attribute information acquired by generation-side information acquiring unit 330. Note that, reference point checking region 734 may accept an editing operation for the coordinate value of the reference point.

Various information setting region 735 accepts setting of various kinds of information other than the above-described information. For example, various information setting region 735 may accept setting of a plurality of separate drawing regions, that is, setting of a plurality of subdivided sub-makeup item, for one makeup item. In this case, various information setting region 735 accepts, for example, setting on a part index being the identification information of a sub-makeup item, and an area group representing disposition of the sub-makeup item relative to any facial feature point.

Further, various information setting region 735 may accept setting of a child-part ID representing association among a plurality of makeup items or sub-makeup items, such as eyeliners or mascara consisting of a set of upper and lower parts. Further, various setting region 735 may accept setting as to whether or not to deform a part image in generating a makeup simulation image (in combining images), such as deformation corresponding to open eyes and closed eyes. Note that, the common attribute information desirably describes format information also as to such setting information.

When a clicking operation is performed on generation completion button 736, part information generator 370 generates part information with the content of part information editing window 730. Note that, information generated by makeup part generator 360 (for example, color information) and information set on part information editing window 730 may not coincide with the format defined by the common attribute information. In this case, part information generator 370 converts such information into a format defined by the common attribute information, to generate part information.

Note that, while not shown in the drawings nor described herein, part information generator 370 also performs setting as to other various kinds of attributes such as the cosmetics information and the user information, for each makeup part according to the format represented by the common attribute information. Part information generator 370 may accept an operation as to such setting on part information editing window 730 shown in FIG. 9, or on other window.

In step S1040 in FIG. 7, part information generator 370 uploads (transmits) the generated part information to information server 200. Note that, part information generator 370 may transmit new part information every time the new part information is generated, or may transmit not-yet-transmitted part information periodically, or at timing specified by the user of makeup part generating apparatus 300.

By such operations repetitively performed in makeup part generating apparatus 300, a multitude of makeup parts generated according to the format represented by the common attribute information are accumulated in information server 200.

FIG. 10 is a diagram showing an exemplary content of a part information group accumulated in information server 200. In FIG. 10, pieces of information in a row represent the content of the part information of one makeup part.

As shown in FIG. 10, part information (group) 750 describes, for each part ID 751, item information 752, part image information 753, positional information 754, color information 755, cosmetics information 756, and user information 757, as the part information defining a makeup part.

Part ID 751 is identification information being unique for each makeup part generated (generated or edited) in the system in which makeup parts are shared.

Item information 752 is information representing the type of a makeup item.

Part image information 753 is reference information for making access to data of a part image.

Positional information 754 is coordinate values of the first to third reference points in a part image. Color information 755 is information representing the color and the manner of overlaying a part image.

Cosmetics information 756 is information representing cosmetics to be used in realizing makeup corresponding to a makeup part.

User information 757 is information to be notified to the utilization side of a makeup part.

Item information 752, positional information 754, color information 755, cosmetics information 756, and user information 757 adhere to, in sequence, item information format 611, color information format 612, cosmetics information format 613, and expiration date format 614 and editability format 615 of common format information 610. Further, positional information 754 has a content based on facial feature points 632 to 634 respectively corresponding to reference points RP1 to RP3 of common part position information 630 (see FIG. 4).

Accordingly, pieces of part information 750 downloadable from information server 200 can be secondarily used properly by the apparatuses by being acquired in combination with the common attribute information.

Figure 11:
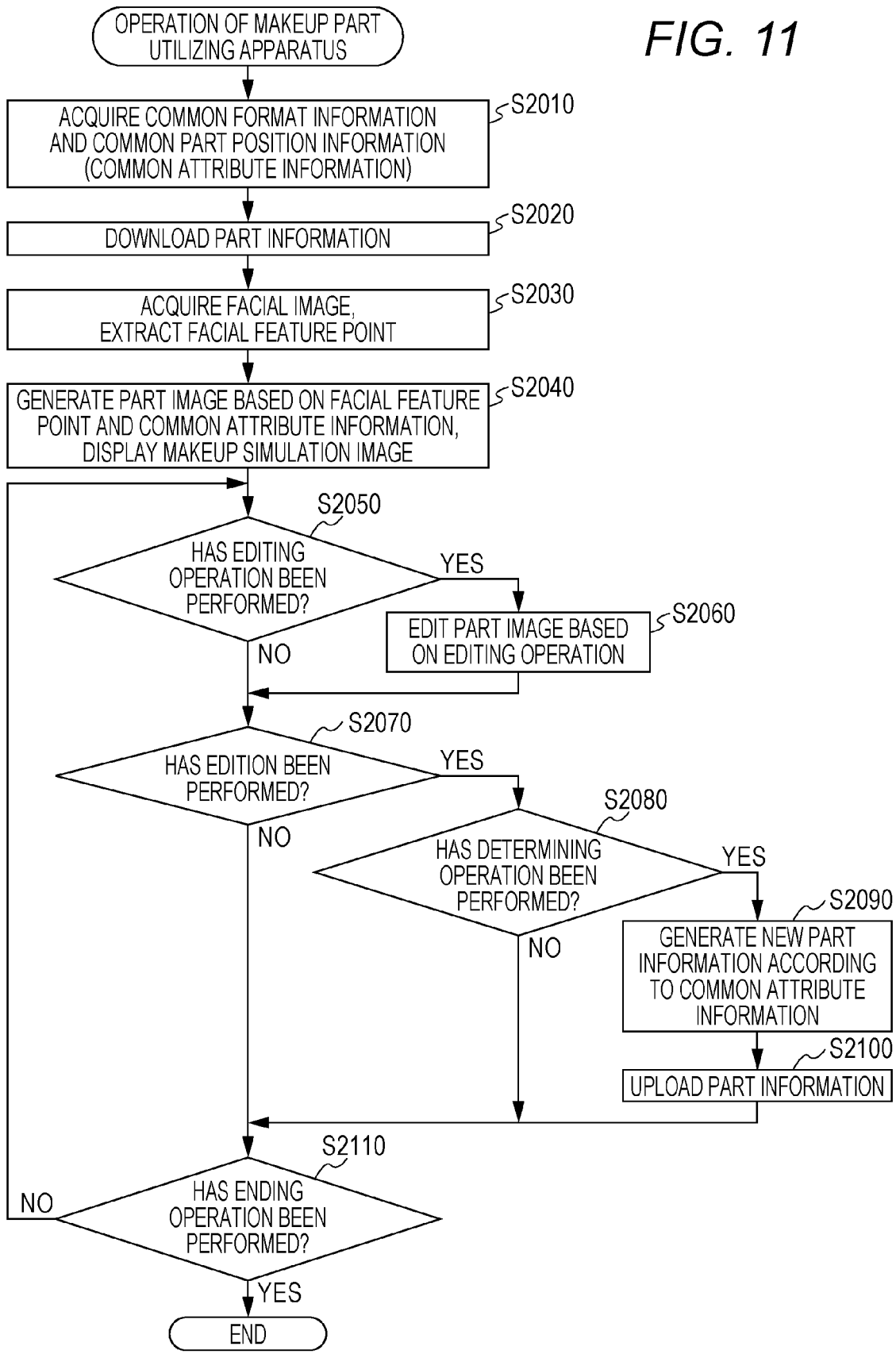
FIG. 11 is a flowchart showing an exemplary operation of the makeup part utilizing apparatus according to the present exemplary embodiment.

FIG. 11 is a flowchart showing an exemplary operation of one makeup part utilizing apparatus 400.

In step S2010, utilization-side information acquiring unit 430 acquires common format information 610 (see FIG. 3) and common part position information 630 (see FIG. 4) (the common attribute information). Note that, utilization-side information acquiring unit 430 desirably acquires the common attribute information from information server 200 at a predetermined cycle such as every week or every six months, at timing specified by the user of makeup part generating apparatus 300, or every time an update notice about the common attribute information is received from information server 200.

In step S2020, for example in response to an operation of the user of makeup part utilizing apparatus 400, part information acquiring unit 470 downloads part information from information server 200. Note that, desirably, part information acquiring unit 470 searches for and acquires a suitable piece of part information for the user in liaison with information server 200, out of a multitude of pieces of part information.

In step S2030, makeup part utilizing unit 480 acquires facial image (picked-up image) 510 (see FIG. 2) picked up by facial image pickup unit 460, and extracts facial feature points from the facial image. Note that, makeup part utilizing unit 480 may determine a facial feature point required for drawing the downloaded part information based on common part position information 630 (see FIG. 4), and extract just the required facial feature point.

In step S2040, makeup part utilizing unit 480 generates a part image from the part information based on the extracted facial feature points and the acquired common attribute information. Then, makeup part utilizing unit 480 overlays the generated part image on the facial image, to generate makeup simulation image 540 (see FIG. 2), and displays makeup simulation image 540 on utilization-side display 450. Note that, makeup part utilizing unit 480 desirably also displays cosmetics information.

In step S2050, makeup part utilizing unit 480 determines whether or not an editing operation on the part image has been performed. When an editing operation has been performed (S2050: YES), makeup part utilizing unit 480 proceeds to step S2060. Further, when an editing operation has not been performed (S2050: NO), makeup part utilizing unit 480 proceeds to step S2070, which will be described later.

Note that, when user information 757 of part information 750 contains "EA1", that is, information representing non-editable, makeup part utilizing unit 480 desirably does not accept an editing operation on the part image.

In step S2060, makeup part utilizing unit 480 edits the part image based on the editing operation. Makeup part utilizing unit 480 generates, for example, a part image editing window for accepting edition of the part image, and displays the part image editing window via utilization-side display 450 and accepts the editing operation via utilization-side operation input 440.

Figure 12:
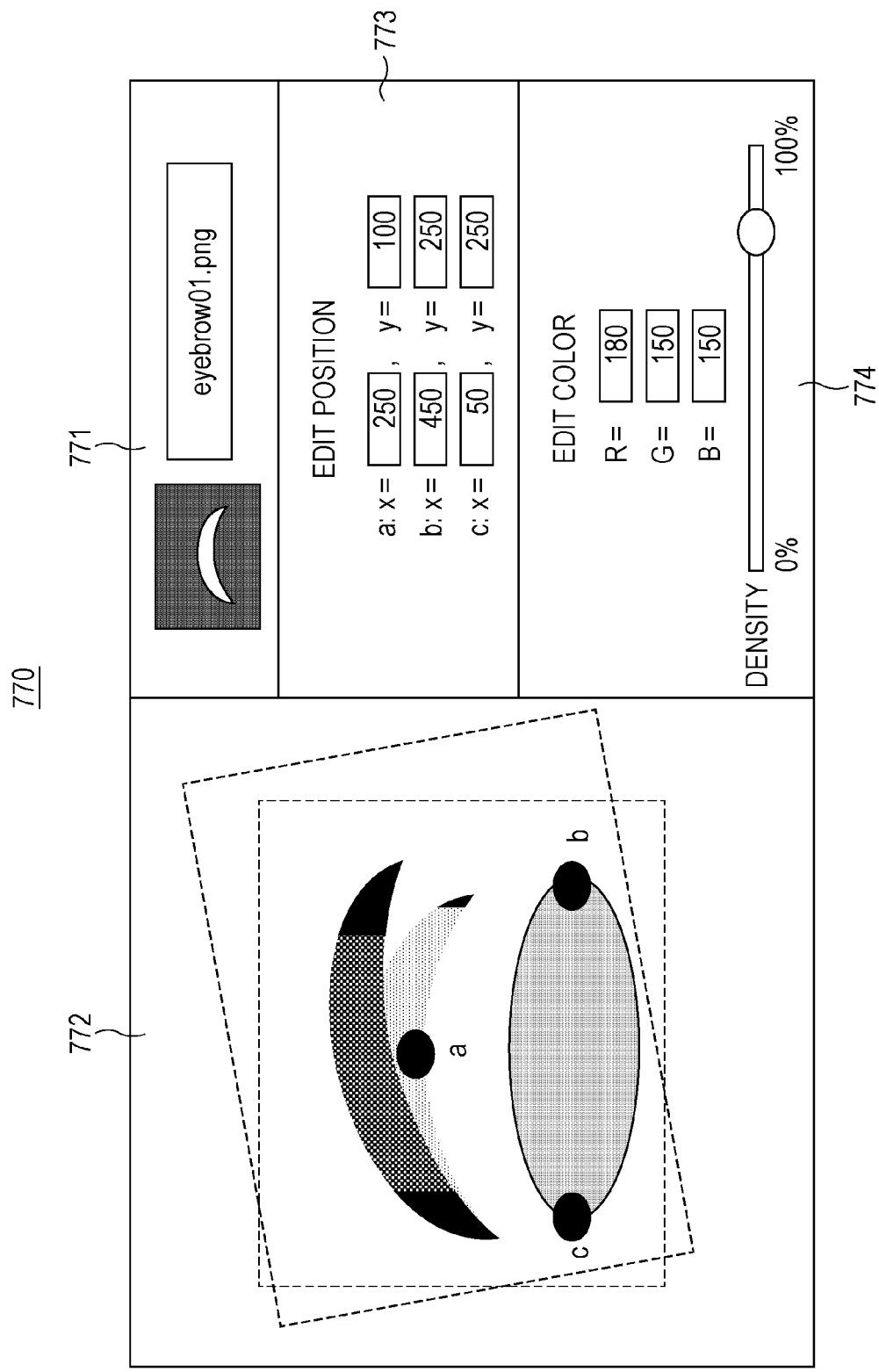
FIG. 12 is a plan view showing an exemplary appearance of a part image editing window according to the present exemplary embodiment.

FIG. 12 is a plan view showing an exemplary appearance of the part image editing window.

As shown in FIG. 12, part image editing window 770 includes item information displaying region 771, overlaid image displaying region 772, position editing region 773, and color editing region 774.

Item information displaying region 771 displays information representing the edition-target part information, such as reference information for making access to the part image, or a thumbnail image of the part information.

Overlaid image displaying region 772 displays in an enlarged manner an image obtained by overlaying edition-target part information on a facial image.

Position editing region 773 accepts an editing operation at the coordinate value of each reference point in the part image, that is, a deforming operation on the part image. Note that, makeup part utilizing unit 480 may accept such a deforming operation by a drag operation on the part image displayed on overlaid image displaying region 772. Note that, makeup part utilizing unit 480 desirably accepts a deforming operation as to reference points RP1 to RP3 (see FIG. 4) included in the common attribute information acquired by utilization-side information acquiring unit 430.

Color editing region 774 accepts an editing operation as to the color of the part image. Note that, makeup part utilizing unit 480 desirably accepts an editing operation as to the color information in color information format 612 (see FIG. 3) included in the common attribute information acquired by utilization-side information acquiring unit 430.

Every time an editing operation is performed, makeup part utilizing unit 480 displays the edited part image substantially in real time on overlaid image displaying region 772. Note that, while not shown in the drawings, part image editing window 770 includes an edit completion button.

In step S2070 in FIG. 11, part information acquiring unit 470 determines whether or not any editing operation has been performed on edition-target part information. When an editing operation has been performed (S2070: YES), part information acquiring unit 470 proceeds to step S2080. Further, when an editing operation has not been performed (S2070: NO), part information acquiring unit 470 proceeds to step S2110, which will be described later.

In step S2080, part information acquiring unit 470 determines whether or not a determination operation has been performed on the edited part image. Such a determination operation is, for example, a clicking operation on the above-described edit completion button. When the determination operation has been performed (S2080: YES), part information acquiring unit 470 proceeds to step S2090. Further, when the determination operation has not been performed (S2080: NO), part information acquiring unit 470 proceeds to step S2110.

In step S2090, according to the format defined by the common attribute information, part information acquiring unit 470 generates and stores part information of the edited part image (makeup part) generated by makeup part utilizing unit 480.

Note that, while not shown in the drawings nor described herein, part information acquiring unit 470 sets also other various attributes such as cosmetics information and user information according to the format represented by the common attribute information, for each makeup part. Part information acquiring unit 470 may accept an operation for such setting on part image editing window 770 shown in FIG. 12, or on other window.

Figure 13:
FIG. 13 is a diagram showing exemplary part information on an edited part image according to the present exemplary embodiment.

FIG. 13 is a diagram showing exemplary part information on an edited part image, and corresponds to FIG. 10. The portions corresponding to those in FIG. 10 are denoted by identical reference characters, and a description thereof will be omitted.

Here, what is shown is an exemplary case where, as to a makeup part defined by part information 750 bearing part ID 751 of "PID1" shown in FIG. 10, R value is adjusted in makeup part utilizing apparatus 400. Further, those portions changed from the original part information 750 are underlined.

As shown in FIG. 13, in color information 755, R value has been changed from R1 to R20. Further, in accordance with such a change in color, the cosmetics information has been changed from "AID1, AN1" to "AID20, AN20". Note that, information server 200 may retain the cosmetics information corresponding to each color for each makeup item, and a change in the cosmetics information may be made in liaison with information server 200. Further, in user information 757, pieces of information representing the creator and the expiration date have been changed from "UID1, VD1" to "UID20, VD20", respectively.

Since such a makeup part is a new makeup part being different from the original makeup part, part ID 751 is changed from "PID1" to "PID20". Note that, the content of part image information 753 is changed corresponding to the edited part image.

In step S2100 in FIG. 11, part information acquiring unit 470 uploads (transmits) the edited (generated) part information to information server 200. Note that, part information acquiring unit 470 may transmit new part information every time the new part information is generated, or may transmit not-yet-transmitted part information periodically, or at timing specified by the user of makeup part utilizing apparatus 400.

In step S2110, part information acquiring unit 470 determines whether or not an instruction of ending the editing process of the part image has been issued by, for example, an operation of the user of makeup part utilizing apparatus 400. When an instruction of ending the editing process of the part image has not been issued (S2110: NO), part information acquiring unit 470 returns to step S2050. Further, when an instruction of ending the editing process of the part image has been issued (S2110: YES), part information acquiring unit 470 ends the editing process.

Note that, makeup part generating apparatus 300 and makeup part utilizing apparatus 400 may achieve secondarily use of the makeup pattern by, for example, generating group information representing a combination of a plurality of makeup parts (hereinafter referred to as the "makeup pattern"), and uploading the group information to information server 200.

FIG. 14 is a diagram showing an exemplary content of the group information.

As shown in FIG. 14, group information 650 describes, for each group ID 651, group attribute 652, makeup envisaged image 653, and part ID 654.

Group ID 651 is identification information uniquely allocated for each makeup pattern. Group attribute 652 is the attribute (name) of each makeup pattern. Makeup envisaged image 653 is an image expressing the envisaged appearance of each makeup pattern. Part ID 654 is a part ID of each makeup part belonging to each makeup pattern.

Note that, the common attribute information desirably defines also the format of each piece of information of the group information 650. Thus, a makeup pattern being a combination of a plurality of makeup parts can also be secondarily used (edited) properly in other apparatus.

Note that, in grouping such a combination of a plurality of makeup parts, desirably, makeup part generator 360 and makeup part utilizing unit 480 accept generation/edition of the plurality of makeup parts as being divided into a plurality of image layers, and display the layers as being overlaid on each other. In this case, for example, part information generator 370 and part information acquiring unit 470 generate part information for individual makeup parts from the layers and group a plurality of pieces of part information generated from the plurality of layers into one makeup pattern, and generate group information.

Further, makeup part utilizing unit 480 desirably accepts an operation of replacing or deleting part of the plurality of makeup parts forming a makeup pattern, or adding a new makeup part.

Effect of Present Exemplary Embodiment

As described above, the makeup part generating apparatus (makeup part generating apparatus 300 and/or makeup part utilizing apparatuses 400) of the present disclosure is an apparatus that generates a makeup part being an image overlaid on a facial image. The makeup part generating apparatus of the present disclosure includes: an information acquiring unit (generation-side information acquiring unit 330 and/or utilization-side information acquiring unit 430) that acquires, from a predetermined place on a communication network, common attribute information representing a format of part information defining a makeup part; and a makeup part generator (part information generator 370 and/ or makeup part utilizing unit 480) that generates and/or edits the makeup part. Further, the makeup part generating apparatus of the present disclosure includes a part information generator (part information generator 370 and/or part information acquiring unit 470) that generates, according to the format represented by the common attribute information having been acquired, the part information defining the makeup part having been generated and/or edited.

Thus, the makeup part generating apparatus of the present disclosure allows a makeup part to be shared even in the case where an apparatus generating the makeup part and an apparatus secondarily using the makeup part employ different systems, and thus allows the makeup part to be secondarily used. That is, the makeup part generating apparatus of the present disclosure can generate a makeup part easier.

Further, makeup part generating system 100 of the present disclosure distributes common attribute information to the apparatuses, and collectively manages makeup parts generated by the apparatuses. Thus, the present disclosure provides reversibility in editing each makeup part, and allows the systems of the apparatuses to work in liaison with each other. Thus, the present disclosure further facilitates secondary use of a makeup part.

Variation of Present Exemplary Embodiment

Note that, the contents of the part information and the common attribute information are not limited to the above-described example.

For example, the apparatuses may include, in the part information, user information that defines the distribution range of a makeup part. Here, the common attribute information must describe format information required for correctly reconstructing the makeup part by analyzing the part information.

Further, the apparatuses may include, in the part information, application recommendation information representing a user attribute suitable for using a makeup part. Such a user attribute may be, age, region, skin color, hair color, dress code, occupation and the like. In this case, information server 200 for example acquires, from makeup part utilizing apparatus 400, the user attribute of the apparatus, and searches for a makeup part coinciding with the user attribute. Then, information server 200 distributes the makeup part to the apparatus. Note that, common attribute information desirably describes format information relating to the user attribute.

Still further, the apparatuses may include, in the part information, recommended part information that represents other makeup part suitable to be used in combination (for example, a makeup part that harmonize with in hue), or other replaceable makeup part (for example, a makeup part that looks similarly). In this case, information server 200 may transmit, for example, not only the makeup part requested by makeup part utilizing apparatus 400, but also other makeup part represented by the recommended part information of the makeup part, or a notification proposing acquisition of the other makeup part. Note that, the common attribute information desirably describes format information relating to the recommended part information.

Still further, the apparatuses may include, in the part information, billing information of the makeup part. The billing information represents that, for example, a predetermined fee is charged on use of the makeup part. In this case, for example, when acquisition of a makeup part is requested by any makeup part utilizing apparatus 400, information server 200 performs a predetermined billing process on the user of makeup part utilizing apparatus 400. Note that, the common attribute information desirably describes format information relating to the billing information.

Still further, when a makeup part is edited, the apparatuses may include (leave), in the part information of the edited makeup part, the attribute information (the user information or the like) of the makeup part before the edition.

Still further, makeup part utilizing unit 480 may modify a part image according to facial feature information included in the part information, such as whether the eyelid is a single eyelid or a double eyelid. In this case, the common attribute information must include format information of the facial feature information, and modification instruction information representing how the part image is to be modified.

Still further, for one makeup item, a plurality of patterns being combinations of reference points (combinations of employed facial feature points) may be provided. Part information generator 370 and makeup part utilizing unit 480 may apply, to a generated or edited makeup part, a plurality of kinds of part positional information. In this case, the common attribute information must include format information for each of the patterns of combinations of reference points. Part information must include information as to which one of the patterns is to be used. Note that, according to the image processing capacity or the like, the employed pattern may be selected on the makeup part utilizing side. In this case, a plurality of patterns differing in the number of reference points may be provided, such as minimum reference points used by a low processing capacity apparatus and additional reference points used by a high processing capacity apparatus.

Still further, the timing at which the apparatuses acquire the common attribute information is not limited to the above-described example. For example, information server 200 collects information relating to the usage history of the makeup parts from a plurality of makeup part utilizing apparatuses 400, analyzes the collected information, and determines makeup parts or makeup patterns in fashion. Then, at the timing at which the makeup parts or makeup patterns having been determined to be in fashion have largely changed, information server 200 instructs makeup part generating apparatus 300 and makeup part utilizing apparatuses 400 to update the common attribute information.

Still further, use of a makeup part refers to, for example, performance of a predetermined process such as downloading the makeup part, generating a makeup simulation image using the makeup part, or performing an operation of purchasing cosmetics corresponding to the makeup part.

Still further, information relating to the usage history of a makeup part may include the content of edition on the makeup part, the attribute or the number of users having used the makeup part, the period and region where the makeup part has been used, other various kinds of environmental information (temperature, humidity, lighting and the like) at the timing where the makeup part has been used, and other makeup part used in combination with the makeup part. By analyzing such various kinds of information, information server 200 can obtain various kinds of useful information as to use of the makeup part.

Still further, when information server 200 permits use of a makeup part based on paid subscribers' registration, information server 200 may transmit the common attribute information to any corresponding apparatus at the time of registration.

Still further, an entity of the attribute information (user information or the like) of the part information of each makeup part may be stored in information server 200, and the part information may just describe link information to the entity. In this case, the apparatuses refer to the link information, make access to the entity of information server 200, and acquire the content of the attribute information.

Still further, in makeup part generating system 100, a plurality of information servers 200 and part information generators 370 may exist, and just a single makeup part utilizing apparatus 400 may exist. Further, information server 200 may be integrated with part information generator 370 or makeup part utilizing apparatus 400. Makeup part utilizing apparatus 400 may be integrated with part information generator 370. Further, the common attribute information may be previously stored as factory default setting in makeup part generating apparatus 300 and makeup part utilizing apparatus 400. In this case also, by receiving update of the common attribute information from information server 200 while the apparatuses are in operation, the common attribute information can be synchronized between different systems.

Still further, part of the configuration of each apparatus may be physically spaced apart from other portion in the configuration of the apparatus. In this case, the plurality of portions being spaced apart from each other must each include a communication unit for establishing communication between them. That is, for example, part of the functions of each apparatus may be cloud-based.

Summary of Present Disclosure

The makeup part generating apparatus of the present disclosure is a makeup part generating apparatus that generates a makeup part being an image overlaid on a facial image, and the apparatus includes: an information acquiring unit that acquires, from a predetermined place on a communication network, common attribute information representing a format of part information defining the makeup part; a makeup part generator that generates and/or edits the makeup part; and a part information generator that generates, according to the format represented by the common attribute information having been acquired, the part information defining the makeup part having been generated and/or edited.

Note that, in the makeup part generating apparatus, the part information generator may store the part information having been generated and/or edited in the predetermined place and/or other place from which other apparatus making access to the predetermined place can acquire the part information having been generated and/or edited.

Further, in the makeup part generating apparatus, the common attribute information may represent a format of at least one of part positional information representing a type of a facial feature point serving as a reference position in overlaying the makeup part, item information representing a type of a makeup item, color information representing color and an overlaying manner of the makeup part, cosmetics information representing cosmetics to be used in realizing makeup corresponding to the makeup part, and editability of the makeup part.

Still further, in the above-described makeup part generating apparatus, the part information generator may apply a plurality of kinds of the part positional information to the makeup part having been generated.

The makeup part generating method of the present disclosure is a makeup part generating method for generating a makeup part being an image overlaid on a facial image, and includes: acquiring, from a predetermined place on a communication network, common attribute information representing a format of part information defining the makeup part; generating and/or editing the makeup part; and generating, according to the format represented by the common attribute information having been acquired, the part information defining the makeup part having been generated and/or edited.

The makeup part generating apparatus and the makeup part generating method of the present disclosure are useful as a makeup part generating apparatus and a makeup part generating method with which a makeup part is generated easier.

What is claimed is:

1. A makeup part generating apparatus for generating a makeup part image to be overlaid on a facial image, the apparatus comprising:
    information acquiring circuitry that acquires, from a place on a communication network, common attribute information representing a format of part information defining the makeup part image;
    a makeup part generator that generates and/or edits the makeup part image newly based on a drawing operation of the user on the makeup part generating apparatus; and
    a part information generator that generates, by formatting the part information according to the format represented by the acquired common attribute information, the part information defining the makeup part image generated and/or edited newly based on the drawing operation of the user; and
    a display displaying a part information editing window for editing the makeup part image, wherein the part information editing window comprises an item setting region, an image selecting region, an image displaying region, a reference point checking region, a various information setting region, and a generation completion button.

2. The makeup part generating apparatus according to claim 1, wherein the part information generator stores the generated part information defining the generated and/or edited makeup part image in the place and/or another place in such a manner that the generated part information is accessible to another apparatus.

3. The makeup part generating apparatus according to claim 1, wherein the common attribute information represents a format including at least one of: part positional information representing a type of a facial feature point serving as a reference position in overlaying the makeup part image; item information representing a type of a makeup item;
  color information representing color and an overlaying manner of the makeup part image;
  cosmetics information representing cosmetics to be used in realizing actual makeup corresponding to the makeup part image; and information representing the editability of the makeup part image.

4. The makeup part generating apparatus according to claim 3, wherein the part information generator adds several kinds of the part positional information to the generated makeup part image.

5. A computer implemented method for generating a makeup part image to be overlaid on a facial image, the method comprising:
  acquiring, from a place on a communication network, common attribute information representing a format of part information defining the makeup part image;
  generating and/or editing the makeup part image newly based on a drawing operation of the user; and
  generating, by formatting the part information according to the format represented by the acquired common attribute information, the part information defining the makeup part image generated and/or edited newly based on the drawing operation of the user on a makeup part generating apparatus; and
  displaying on a display a part information editing window for editing the makeup part image, wherein the part information editing window comprises an item setting region, an image selecting region, an image displaying region, a reference point checking region, a various information setting region, and a generation completion button.

6. The makeup part generating apparatus according to claim 1, further comprising a drawing interface for accepting the drawing operation.

7. The makeup part generating apparatus according to claim 6, wherein the drawing interface comprises an operation input device and a display.

8. The makeup part generating apparatus according to claim 7, wherein the display displays a part image generating window for accepting a generating operation of the makeup part image.

9. The makeup part generating apparatus according to claim 8, wherein the part image generating window comprises a facial image displaying region, an edition-target part selecting region, an edition menu region, and a brush selection list region.

10. The makeup part generating apparatus according to claim 1, wherein the part information editing window also edits a sub-makeup item of the makeup part image.

11. The makeup part generating apparatus according to claim 10, wherein the various information setting region accepts setting of a child-part ID representing association among a plurality of makeup items or the sub-makeup items.

12. The makeup part generating apparatus according to claim 11, wherein the makeup items or the sub-makeup items comprise eyeliner or mascara having a set of upper and lower parts.

13. The makeup part generating apparatus according to claim 12, wherein the various information setting region also accepts a setting as to whether or not to deform the makeup part image in generating a makeup simulation image, such as deformation corresponding to open eyes and closed eyes.

* * * * *